(12) United States Patent
Khafizov et al.

(10) Patent No.: US 12,547,528 B2
(45) Date of Patent: Feb. 10, 2026

(54) TEST CASE GENERATION FROM REQUIREMENTS

(71) Applicant: Verizon Patent and Licensing Inc., Basking Ridge, NJ (US)

(72) Inventors: Farid Khafizov, Plano, TX (US); Mark Ernest Newbury, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 105 days.

(21) Appl. No.: 17/692,604

(22) Filed: Mar. 11, 2022

(65) Prior Publication Data

US 2023/0289282 A1  Sep. 14, 2023

(51) Int. Cl.
  *G06F 11/3668* (2025.01)
(52) U.S. Cl.
  CPC ...... *G06F 11/3684* (2013.01); *G06F 11/3688* (2013.01)
(58) Field of Classification Search
  CPC .................. G06F 11/3684; G06F 11/3688
  See application file for complete search history.

(56) References Cited

U.S. PATENT DOCUMENTS

| | | | |
|---|---|---|---|
| 9,417,854 B1 * | 8/2016 | Agrawal | G06F 8/10 |
| 11,726,900 B2 * | 8/2023 | Culibrk | G06F 17/18 |
| | | | 717/124 |
| 2012/0272206 A1 * | 10/2012 | Sengupta | G06F 40/205 |
| | | | 717/101 |
| 2017/0278510 A1 * | 9/2017 | Zhao | G06F 40/30 |
| 2020/0012917 A1 * | 1/2020 | Pham | G06F 16/90335 |
| 2020/0019492 A1 * | 1/2020 | Fei | G06N 7/01 |
| 2020/0301672 A1 * | 9/2020 | Li | G06F 8/77 |
| 2022/0283933 A1 * | 9/2022 | Sharma | G06F 16/254 |
| 2022/0398374 A1 * | 12/2022 | Chowdhury | G06N 3/08 |

FOREIGN PATENT DOCUMENTS

WO  WO-2022028721 A1 *  2/2022

OTHER PUBLICATIONS

Wang et al., "Automatic Generation of System Test cases form Use Case Specifications", published by ACM, ISSTA'15, Jul. 13-17, 2015, Baltimore, MD USA, pp. 385-396 (Year: 2015).*

(Continued)

*Primary Examiner* — Wei Y Mu

(57) ABSTRACT

A method, a device, and a non-transitory storage medium are described in which a test case generation service is provided. The service may include receiving and validating requirement text associated with a prospective test case and/or test script. The service may invoke a remedial procedure when the requirement text is not validated. The service may include selecting multiple types of classification models based on a model profile. The service may include aggregating probability values associated with classifications for sentences, and approving such classification that satisfy a threshold value. The service may further include generating test cases and/or test scripts. The service may generate a schedule for test cases and/or test scripts based on one or multiple criteria values generated by one or multiple predictive models.

20 Claims, 6 Drawing Sheets

(56) References Cited

OTHER PUBLICATIONS

Bhattacharjee et al., "Automatic Test Case Generation in Model Based Software Design to Achieve Higher Reliability", published by IEEE, 2010 2nd International Conference on Reliability, Safety & Hazard (ICRESH-2010), pp. 493-499 (Year: 2010).*

Dadeau et al., "Test Generation and Evaluation from High-Level Properties for Common Criteria Evaluations—The TASCCC Testing Tool-", published by IEEE, 2013 IEEE Sixth International Conference on Software Testing, Verification and Validation, pp. 431-438 (Year: 2013).*

\* cited by examiner

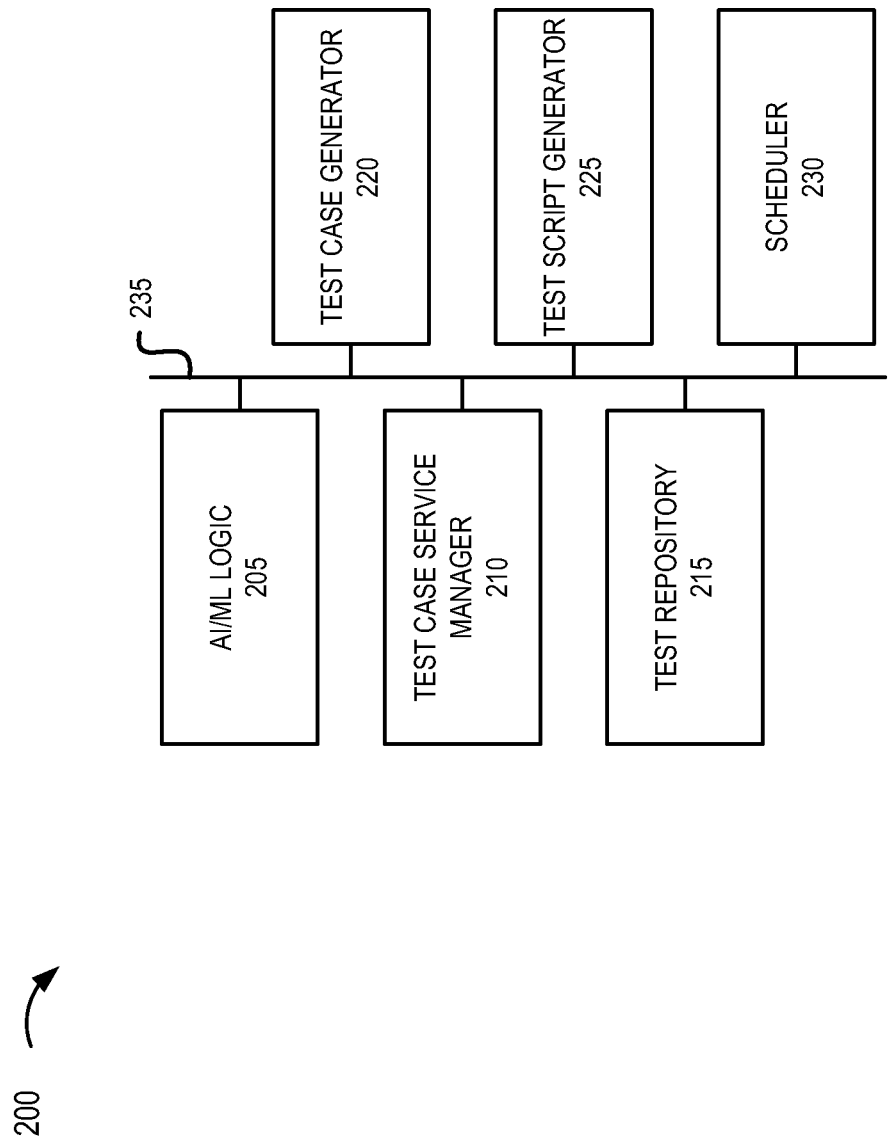

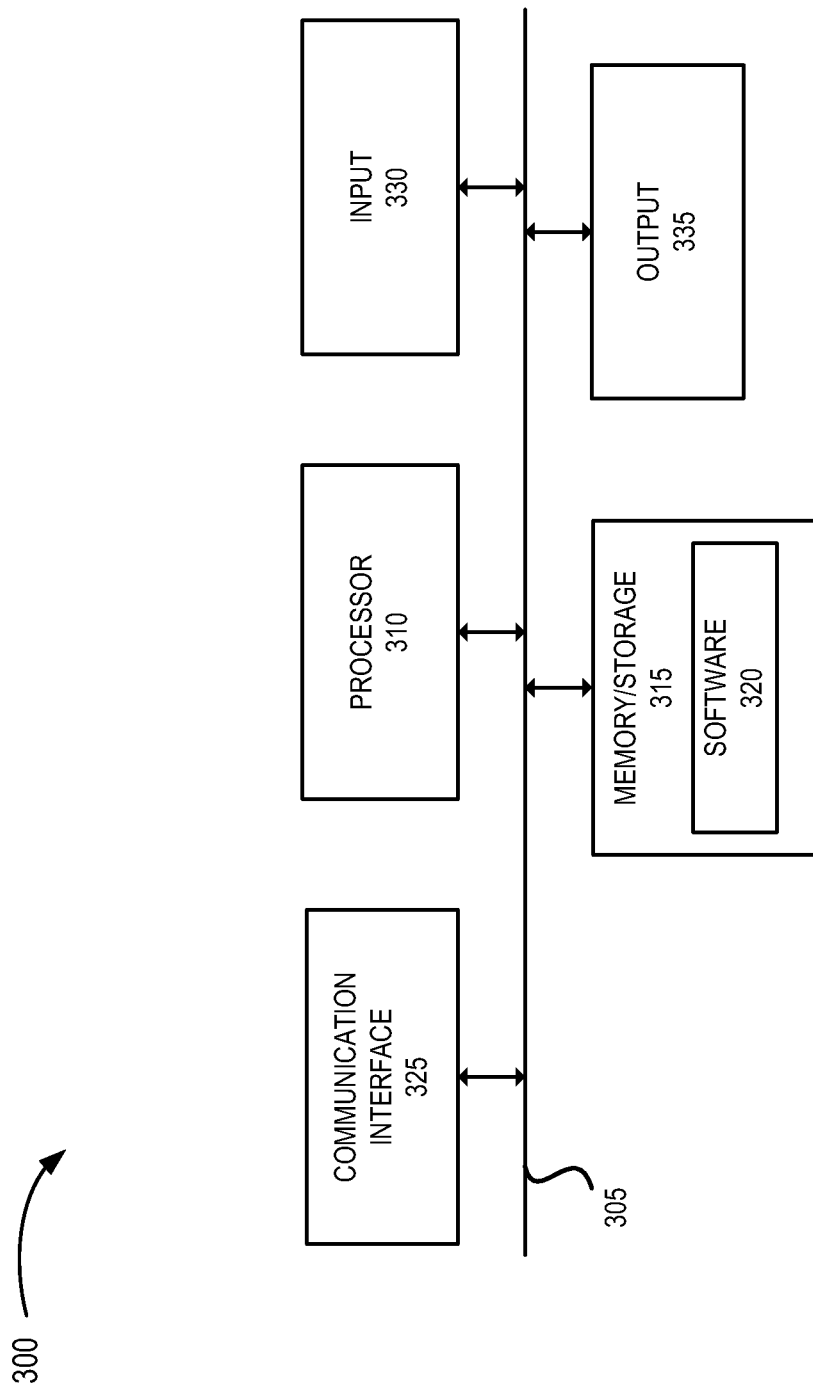

TEST CASE GENERATION FROM REQUIREMENTS

BACKGROUND

Development and design of networks present certain challenges from a network-side perspective and an end device perspective. Service providers, network providers, and/or other types of entities may perform tests on devices to ensure that such devices operate according to certain specifications or requirements.

BRIEF DESCRIPTION OF THE DRAWINGS

FIG. 2 is a diagram illustrating an exemplary configuration of an exemplary embodiment of the test case generation service;

FIG. 3 is a diagram illustrating exemplary components of a device that may correspond to one or more of the devices illustrated and described herein;

DETAILED DESCRIPTION

Figure 1:
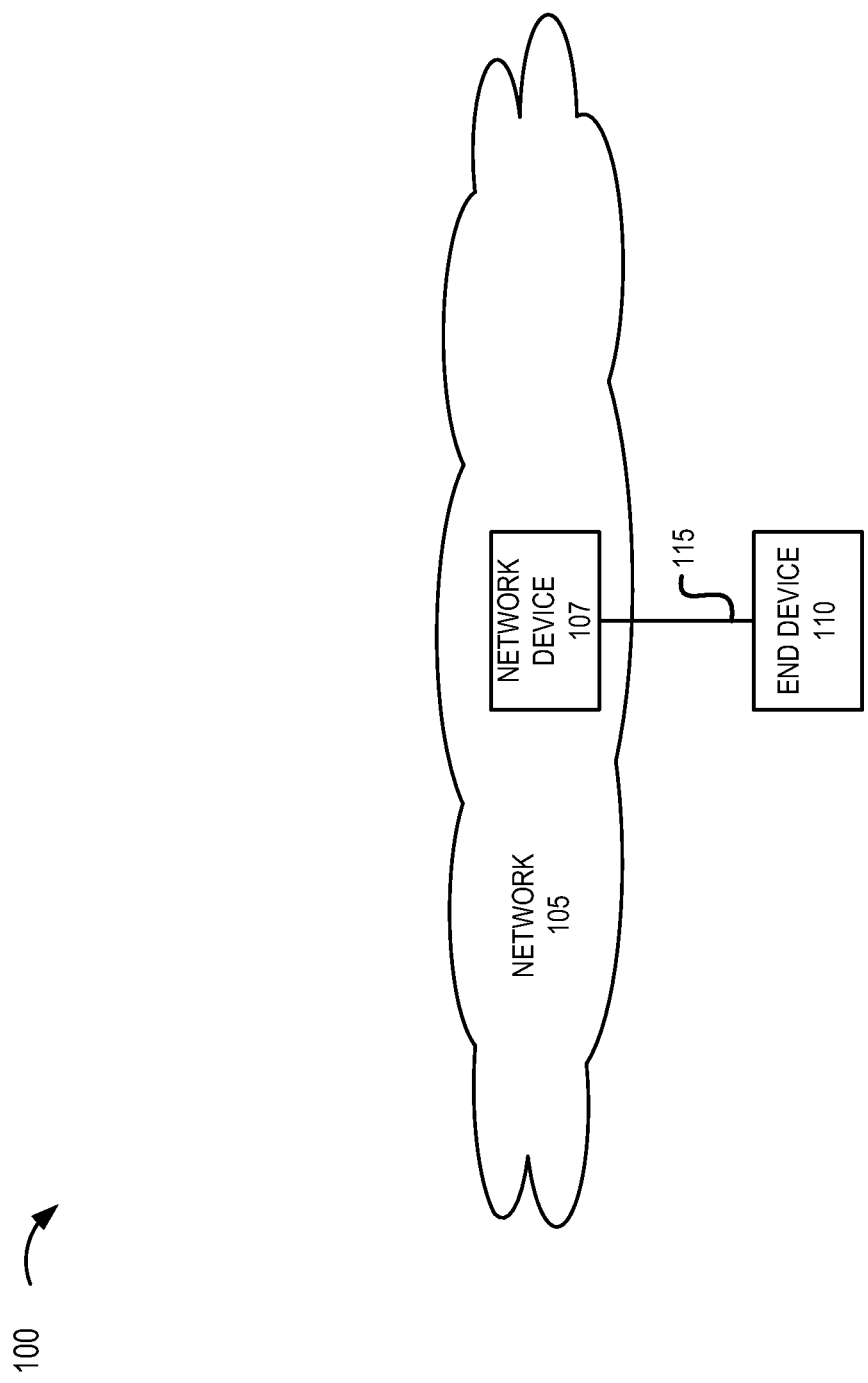
FIG. 1 is a diagram illustrating an exemplary environment in which an exemplary embodiment of a test case generation service may be implemented.

The following detailed description refers to the accompanying drawings. The same reference numbers in different drawings may identify the same or similar elements. Also, the following detailed description does not limit the invention.

A service provider, a network provider, and/or another type of entity may perform tests on network devices, end devices, and/or components thereof to ensure a specified operability. For example, a release of new software, an update, or another type of configuration for a network device and/or end device of a wireless network may go through detailed testing before provisioning. A test is prepared and performed in a controlled environment to ensure accuracy.

Typically, before tests cases are generated, a person will specify the requirements of the test. For example, the requirements may relate to functionality requirements, performance requirements, and/or another type of testable criterion. However, such requirements may be written in free-form and from a person that may not be a subject matter expert or well-versed in running tests. For example, the requirements may be incomplete, difficult to understand, may include uncommon or incorrect terminology, and/or may not accurately describe the steps and/or the sequence of the steps needed to perform a test case. As a consequence, test cases that are generated based on such requirements may be of poor quality and may have to be re-evaluated and/or rewritten by more experienced individuals. Also, a testing system may have limited resources, such as testing equipment, human resources, and the like, along with time constraints for completing the test or tests. These issues can lead to sub-optimal use of resources and delayed rollouts or deployments of upgrades or modifications to a network device and/or an end device of a network, for example.

According to exemplary embodiments, a test case generation service is described. According to an exemplary embodiment, the test case generation service may include an automated test case generation based on a model, such as artificial intelligence (AI) and/or machine learning (ML) model, as described herein. According to an exemplary embodiment, the test case generation service may include automatically analyzing requirement text. According to an exemplary embodiment, the test case generation service may include classifying a sentence based on different types of classification models and a model profile, as described herein. According to an exemplary embodiment, the test case generation may evaluate the classified sentence to a threshold value. According to an exemplary embodiment, when the threshold value is satisfied, the test case generation service may generate a test case and/or a test script based on the classified sentence, as described herein. According to an exemplary embodiment, the test case generation service may generate or update a test schedule based on one or multiple criteria, as described herein.

In view of the foregoing, the test case generation service may improve the efficiency of test case generation, optimize use of testing resources, and improve expediency of rollouts or deployments of upgrades or modifications to a network device, an end device, a system, a platform, or a network, for example.

FIG. 1 is a diagram illustrating an exemplary environment 100 in which an exemplary embodiment of test case generation service may be implemented. As illustrated, environment 100 may include a network 105. Network 105 may include a network device 107. Environment 100 may include an end device 110.

Environment 100 may include a communication link 115 between network 105 and network device 107 and/or between end device 110 and network 105 and/or network device 107. A communicative connection via communication link 115 may be direct or indirect. For example, an indirect communicative connection may involve an intermediary device and/or an intermediary network not illustrated in FIG. 1. A direct communicative connection may not involve an intermediary device and/or an intermediary network. The number and arrangement of communication link 115 illustrated in environment 100 are exemplary. Communication link 115 may be wired, wireless, and/or optical.

Network 105 may include one or multiple networks of one or multiple types and/or technologies. For example, network 105 may include a wireless network, a wired network, and/or an optical network. Network 105 may be implemented to include a local area network (LAN), a radio access network (RAN), a core network, a service provider network, a network management network, or another type of network that may support access and/or use of the test case generation service.

Network device 107 may include a network device that provides the test case generation service, in whole or in part, as described herein. For example, network device 107 may include a component that provides a function, a step, or a process of the test case generation service, as described herein. For example, network device 107 may include AI logic and/or ML logic that includes providing natural language processing (NLP). Network device 107 may include other logic that provides a function, a step, or a process of the test case generation service, as described herein. According to some exemplary embodiments, network device 107 may provide the test case generation service, in whole or in part, in an automated manner. Network device 107 is described further below.

End device 110 may include a device that provides the test case generation service, in whole or in part, as described herein. End device 110 may include a component that provides a function, a step, or a process of the test case generation service, as described herein. For example, the component may be similar to that of network device 107, as described herein. According to some exemplary embodiments, end device 110 may provide the test case generation service, in whole or in part, in an automated manner. According to various exemplary embodiments, end device 110 may be implemented as a mobile device, a portable device, a stationary device (e.g., a non-mobile device and/or a non-portable device), a device operated by a user, or a device not operated by a user. For example, end device 110 may be implemented as a computer (e.g., desktop, laptop, or the like), a workstation, or a terminal.

Communication link 115 may include a wireless, a wired, and/or an optical link. Communication link 115 may support a communicative connection, a communication session, exchange of data, and the like.

According to various exemplary embodiments, the test case generation service may be implemented entirely by end device 110, entirely by network device 107, or collaboratively by end device 110 and network device 107. In view of these different embodiments, environment 100 may be different than that depicted in FIG. 1. For example, according to other exemplary embodiments, environment 100 may not include network 105, network 107 and communication link 115, or alternatively, environment 100 may not include end device 110 and communication link 115. According to still other embodiments, environment 100 may be implemented to include additional or fewer network devices, end devices, networks, and/or communication links. In this regard, for example, the number and arrangement of network device 107 and end device 110 are exemplary. For purposes of description, end device 110 is not considered a network device.

A network device, a network element, or a network function (referred to herein simply as a network device) may be implemented according to one or multiple network architectures, such as a client device, a server device, a peer device, a proxy device, and/or a virtualized network device. Additionally, the network device may be implemented according to various computing architectures, such as centralized, distributed, and/or another type of computing architecture. The network device may also be implemented as a network platform, a network system, a network service, or the like.

FIG. 2 is a diagram illustrating exemplary components 200 that may provide an exemplary embodiment of the test case generation service. For example, components 200 may include an AI/ML logic 205, a test case service manager 210, a test repository 215, a test case generator 220, a test script generator 225, a scheduler 230, and a communication link 235. According to various exemplary embodiments, one or multiple components (including all components) may be implemented on network device 107 and/or end device 110.

AI/ML logic 205 may include multiple types of models. For example, AI/ML logic 205 may include classification predictive models. For example, the classification predictive models may include a multi-class classification model, a multi-label classification model, and/or an imbalanced classification model. The classification predictive models may include a tree-based model, a transformer model, a vector-based model, and/or another type of A/ML algorithm. For example, the AI/ML algorithm may include logistic regression, Naïve Bayes, K-Nearest Neighbors, decision tree, Random Forest, extreme gradient boosting, support vector machine, clustering via embedding, dense neural networks, convolutional neural network, long-short-timer memory network, recurrent neural network, and/or Bidirectional Encoder Representations from Transformers (BERT). AI/ML logic 205 may include other types of models, such as a runtime prediction model that may predict a runtime for a test case or a test script and/or a value prediction model that may predict an importance or a priority relating to scheduling and execution of a test case or a test script based on one or multiple criteria, as described herein.

Test case service manager 210 may include logic that provides executive tasks of the test case generation service. For example, test case service manager 210 may determine whether a classification satisfies a threshold value, as described herein. Additionally, for example, test case service manager 210 may generate, apply, and modify a model profile, as described herein. Test case service manager 210 may include other logic, such as a test execution engine.

Test repository 215 may store information relating to the test case generation service. For example, test repository 215 may store requirements, acceptable requirements, test cases, test scripts, test results, test values, test runtimes, and/or other data (e.g., test domains, test values, runtimes, lab profiles, deadlines, lab profiles, and the like). According to an exemplary embodiment, test repository 215 may store data/information in a manner that correlates or links a requirement text with these other exemplary types of data/information (e.g., acceptable requirement, a test case, a test script, a test result, a test value, etc.). Test repository 215 may include storage for test case and/or test script queues relating to scheduling.

Test case generator 220 may include logic that generates a test case based on classifications of sentences determined by AI/ML logic 205, as described herein. Test script generator 225 may include logic that generates a script or another form of executable instructions or code (referred to herein as simply "test script") based on the classifications of sentences determined by AI/ML logic 205, as described herein. Test script generator 225 may include logic implemented using a programming language, such as a scripting language (e.g., JavaScript, Perl, Python, Ruby, or the like).

Scheduler 230 may include logic that generates a schedule relating to the execution or performance of test cases and/or test scripts and the obtainment of test results. Scheduler 230 may generate (or update) a schedule based on one or multiple criteria. For example, scheduler 230 may consider a test value associated with each test case/test script. The test value may be calculated by AI/ML logic 205 (e.g., a value prediction model). The test value may indicate a priority of the test case/test value. The test value may be derived by various factors, such as time deadline for test result, importance of test (e.g., minor versus major upgrade of software), domain of requirement (e.g., security, graphical user interface, physical layer, or another element or facet of a network device associated with a network, an end device of users of the network, or the like), dependency with other test cases/test scripts, and/or other configurable criteria. Scheduler 230 may generate (or update) the schedule based on other data/information stored in test repository 215, such as runtime, lab profile (e.g., testing resources), utility, and/or other metrics, as described herein. Scheduler 230 may optimize the schedule based on information/data stored in test repository 215 relating to test cases and/or test scripts given test system resources, as described herein.

Communication link 235 may include a hardware link (e.g., a bus, a shared memory space, etc.), a software link (e.g., inter-process communication (IPC) or the like), an application programming interface (API), or some other type of communicative link (e.g., communication link 115).

FIG. 2 illustrates exemplary components that may provide an exemplary embodiment of the test case generation service, however according to other exemplary embodiments, additional, fewer, and/or different components may be implemented. For example, a single component may be implemented as multiple components and/or multiple components may be implemented as a single component. Additionally, or alternatively, the exemplary components may be implemented on a single device or multiple devices.

FIG. 3 is a diagram illustrating exemplary components of a device 300 that may be included in one or more of the devices described herein. For example, device 300 may correspond to network device 107, end device 110, AI/ML logic, models, and/or other types of components, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to network device 107, software 320 may include an application that, when executed by processor 310, provides a function and/or a process of test case generation service, as described herein. Additionally, with reference to AI/ML device 205, software 320 may include an application that, when executed by processor 310, provides a function and/or a process of test case generation service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device and an end device may be implemented according to various computing architectures and according to various network architectures. Device 300 may be implemented in the same manner.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4A:
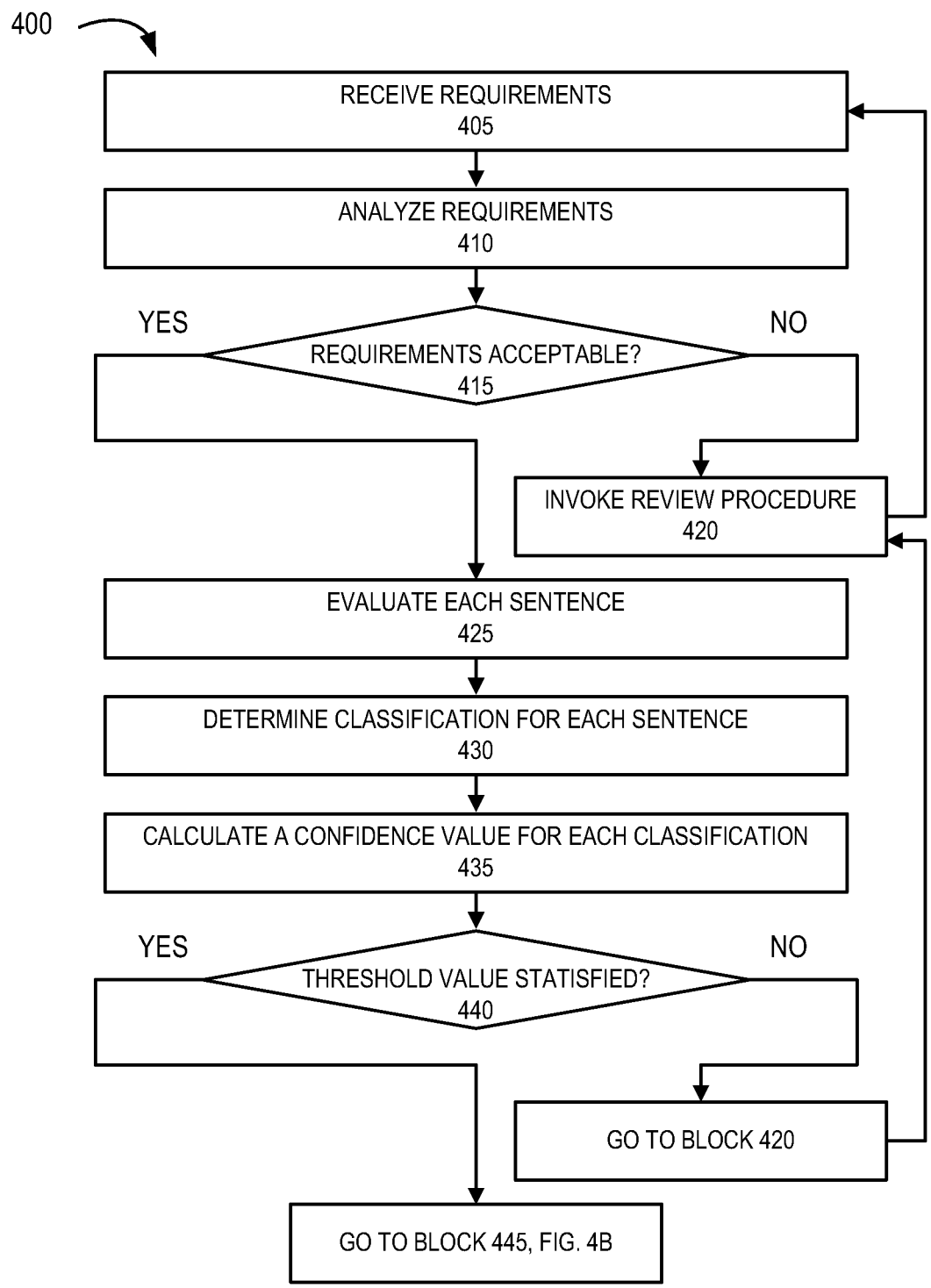
FIGS. 4A and 4B are flow diagrams illustrating an exemplary process of an exemplary embodiment of the test case generation service.
Figure 4B:
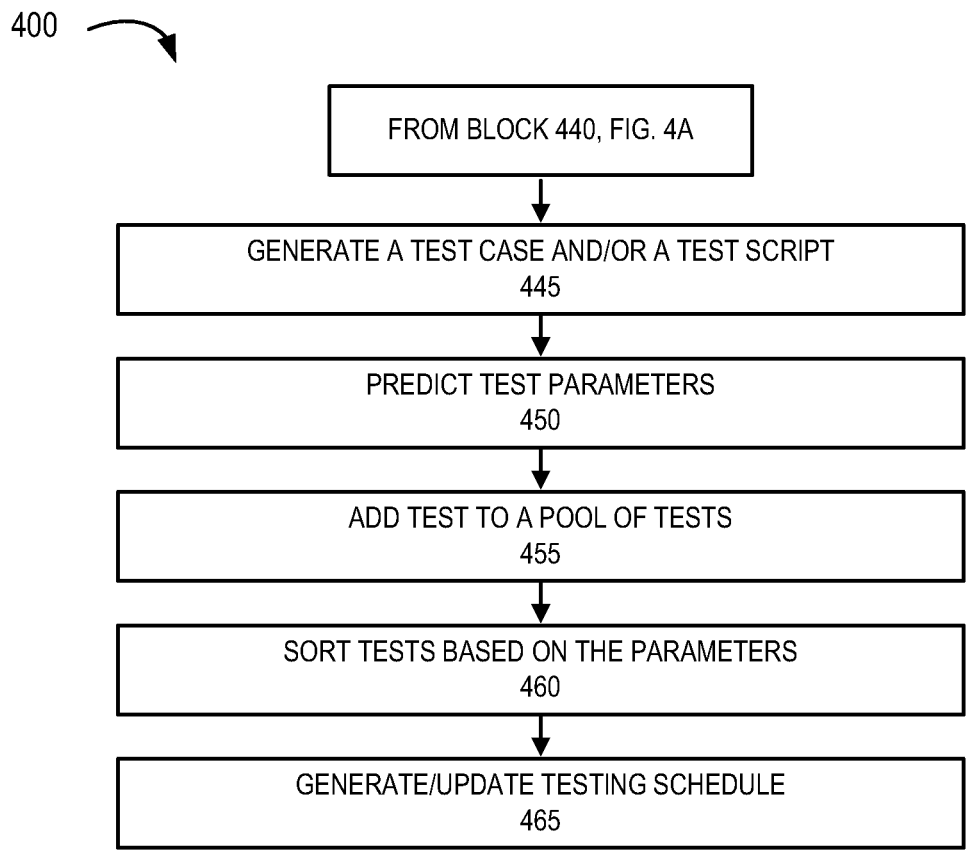

FIGS. 4A and 4B are flow diagrams illustrating an exemplary process 400 of an exemplary embodiment of the test case generation service. According to an exemplary embodiment, network device 107 may perform a step of process 400. According to an exemplary embodiment, end device 110 may perform a step of process 400. According to an exemplary embodiment, network device 107 and end device 110 may perform a step jointly or cooperatively. With the above in mind, for the sake of simplicity, process 400 is described as being performed by network device 107. According to an exemplary implementation, processor 310 executes software 320 to perform the step of process 400, as described herein. Alternatively, the step may be performed by execution of only hardware.

Referring to FIG. 4A, in block 405, network device 107 may receive requirements. For example, the requirements may relate to a desired test case and/or test script to be generated. The requirements may be implemented as an electronic file, for example. The requirements may include words, phrases, sentences, abbreviations, numerical values, punctuation, symbols, and/or other forms of text. According to an exemplary implementation, the requirements may be specified in English, free-form English, formal English, or the like, or some combination thereof. As an example, for purposes of description, an exemplary requirement may be implemented as:

Assume UE in E-UTRA RRC_CONNECTED state.
If SS sends an RRCConnectionReconfiguration message including RACH-ConfigDedicated information element.
Make sure UE sends a prach preamble given in the RACH-ConfigDedicated on the target cell. (1).

In the above example, the requirement text includes 3 sentences. Also, according to this example, each sentence is labeled (e.g., "Assume," "If," and "Make sure"). For purposes of description, the term "sentence" may include a sentence (e.g., in the formal sense) or a word, a phrase, a sentence fragment, a statement, or another representation of a condition, a result, routine, a subroutine, or other element of the requirements, which may include a number, an equation, and so forth.

In block 410, network device 107 may analyze the requirements. For example, network device 107 may analyze multiple criteria that relate to the substance and form of the requirement text. According to an exemplary embodiment, network device 107 may include analyzing the requirement text for spelling, spacing, punctuation, syntax, grammar, and/or other types of typographical, linguistic, and/or logical errors or informalities. According to an exemplary embodiment, network device 107 may include analyzing the domain of the requirement text (e.g., that the requirement belongs to a single domain), labeling of sentences, ordering of sentences, the presence or absence of keywords or labeling of a sentence, that the requirement text includes a minimum number of sentences, a minimum number of keywords or labels, that the requirement text does not exceed a maximum number of words, and/or other formalities relating to a pre-defined format, keywords set, terminology, and/or formality for requirement text.

In block 415, based on the result of the analysis, network device 107 may determine whether the requirements are acceptable. For example, network device 107 may determine the acceptability of the requirements based on the applied criteria. Network device 107 may include logic that may correct some errors (e.g., typographical, translate synonyms of keywords or labels to acceptable keywords or labels, reorder sentences, format, change original terminology to acceptable terminology based on a determined domain of the requirement text, or the like). For example, referring to requirement text (1) above, network device 107 may change the sentence label of "Make sure" to "Then" or may change the sentence label "Assume" to "With" or another pre-defined keyword or label.

When it is determined that the requirements are not acceptable (block 415—NO), network device 107 may invoke a review procedure (block 420). For example, network device 107 may generate a report indicating a failure for the requirement text. Network device 107 may identify the errors and provide, for example, pre-defined error codes. Network device 107 may indicate that the requirement text is to be reviewed, updated, and/or subject to another type of remedial measure before further processing of the requirements. The unacceptable requirement text may be reviewed and/or revised by a person (e.g., a testing administrator or another qualified individual) based on the identified error codes and/or other indications.

When it is determined that the requirements are acceptable (block 415—YES), network device 107 may evaluate each sentence (block 425). For example, multiple and different classification models, which may be selected based on a process 500, as described herein, may evaluate each sentence of the requirements. By way of further example, a tree-based model, a vector-based model, and a transformer-based model, and/or another type of classification predictive model may evaluate each sentence.

In block 430, network device 107 may determine the classification of each sentence based on the evaluation. For example, the multiple and different classification models may determine a probability value associated with a classification of a sentence, as described in process 500.

In block 435, network device 107 may calculate a confidence value for the selected classification of each sentence. For example, network device 107 may aggregate the probability values. For example, network device 107 may average the probability values. Alternatively, network device 107 may perform a weighted averaging of the probability values. For example, a weighting value may be generated based on the specific model profile values associated with the classification model relative to the other model profile values associated with the other classification models. The aggregated probability value may be indicative of a confidence value. According to an exemplary implementation, the confidence value may be normalized between 0 and 1, for example.

In block 440, network device 107 may determine whether the confidence value satisfies a confidence threshold value. For example, network device 107 may compare the confidence value to the confidence threshold value. The confidence threshold value may be configurable and may indicate a minimal level of validity or acceptability of the predicted class for the sentence, for example.

When it is determined that the confidence threshold value is not satisfied (block 440—NO), process 400 may return to block 420. For example, network device 107 may generate a report and/or request an update to the requirements, the selection of classification models, and/or the model profile.

When it is determined that the confidence threshold value is satisfied (block 440—YES), network device 107 may generate a test case and/or a test script (block 445). For example, network device 107 may generate a procedure, which may include a pre-condition, test step(s), test data, and an expected result. The test case may include other information, description, and/or data (e.g., test identifier, test name, actual result, priority, type of test case, bug identifier, etc.). Additionally, or alternatively, network device 107 may generate a test script, as described herein.

In block 450, network device 107 may predict test parameters. For example, network device 107 may predict the test case runtime and/or the test script runtime based on a run-time prediction model. According to another example, network device 107 may predict a test value based on a value prediction model.

In block 455, network device 107 may add test to a pool of tests. For example, network device 107 may add the test case and/or the test script to test repository 215 with information of relevance (e.g., correlated or linked data/information) to the requirements, the test case, and/or the test script. The pool of tests may relate to test cases and/or test scripts to be executed or performed and obtain test results.

In block 460, network device 107 may sort the tests based on the parameters. For example, network device 107 may sort the test cases and/or test scripts according to their test values, runtimes, and/or other configurable metric or criterion.

In block 465, network device 107 may generate and/or update a testing schedule. For example, network device 107 may generate (or update) the testing schedule for the test cases and/or the test scripts, as described herein. Network device 107 may be configured to optimize the testing schedule.

FIGS. 4A and 4B illustrate an exemplary embodiment of a process of the test case generation service, according to other exemplary embodiments, the test case generation service may perform additional operations, fewer operations, and/or different operations than those illustrated and described.

Figure 5:
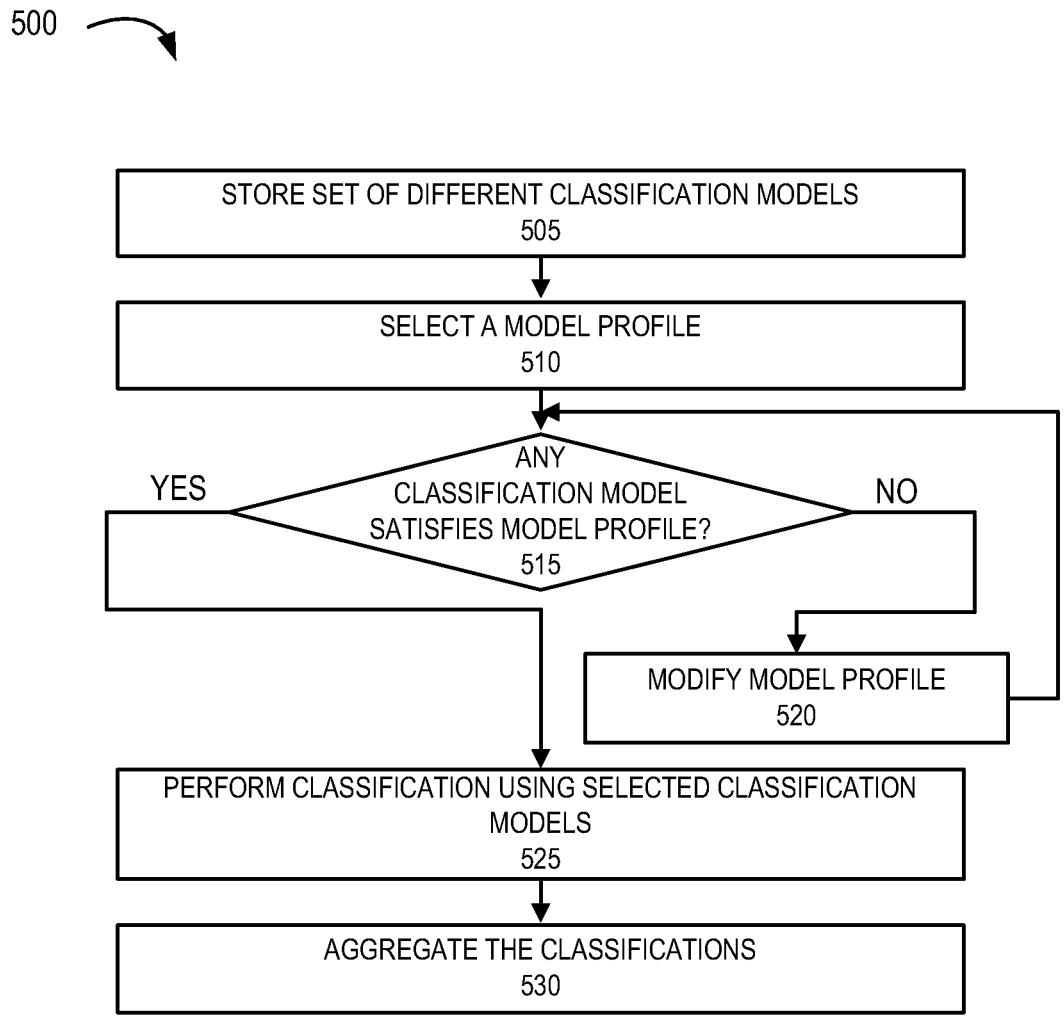
FIG. 5 is a flow diagram illustrating another exemplary process of an exemplary embodiment of the test case generation service.

FIG. 5 is a flow diagram illustrating an exemplary process 500 of an exemplary embodiment of the test case generation service. According to an exemplary embodiment, network device 107 may perform a step of process 500. According to an exemplary implementation, processor 310 executes software 320 to perform the step of process 500, as described herein. Alternatively, the step may be performed by execution of only hardware.

In block 505, network device 107 may store or have access to a set of different classification models. For example, the set of different classification models may include tree-based models, vector-based models, transformer-based models, and/or other well-known classes of classification models. The classification models may relate to multi-class, multi-label, and/or imbalanced classification.

In block 510, network device 107 may select a model profile. For example, the model profile may relate to an accuracy, a utility, a precision, a recall, an F-score, a logarithmic loss, a receiver operator characteristic (ROC) curve, or another performance metric value or range of values, or cumulative versus non-cumulative values. By way of further example, the utility may relate to runtime (e.g., for training or inference), resource usage (e.g., RAM, CPU, or the like), or both (e.g., utility value=RAM*runtime). The model profile may provide a threshold performance for a classification model to satisfy to be considered a candidate classification model for use in a test case generation procedure for a given requirement.

In block 515, network device 107 may determine whether any classification model satisfies the model profile. For example, network device 107 may compare the model profile to an expected performance of one or multiple types of classification models (e.g., tree-based, vector-based, transformer-based, or the like).

When it is determined that no classification model satisfies the model profile (block 515—NO), network device 107 may modify the model profile (block 520). For example, network device 107 may adjust the value or range of values relating to the threshold performance. Post modification, process 500 may return to block 515.

When it is determined that the classification model satisfies the model profile (block 515—YES), network device 107 may perform classification using the selected classification models (block 525). For example, the selected models may use different classification techniques to determine classifications associated with the requirements.

In block 530, network device 107 may aggregate the classifications. For example, network device 107 may aggregate (e.g., average, apply a weighting, or the like) the probabilities of the predicted classification obtained from the different classification models/techniques. Additionally, or alternatively, network device 107 may compare a probability value associated with the classification to a threshold probability value. Network device 107 may select the classification of the sentence (e.g., keyword or label) based on the aggregation and/or comparison procedure(s).

FIG. 5 illustrates an exemplary embodiment of a process of the test case generation service, according to other exemplary embodiments, the test case generation service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 4A, 4B, and 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   analyzing, by a device, a requirement text relating to at least one of a test case or a test script;
   selecting, by the device based on the analyzing and in response to determining that the requirement text does not include an error, a model profile, wherein the model profile indicates a resource usage criterion to satisfy by each classification model before permitted to classify each sentence of the requirement text;
   determining, by the device, a classification for each sentence of the requirement text based on classifying each sentence using multiple types of classification models that satisfied the model profile, wherein the multiple types of classification models include a tree-based classification model, a vector-based classification model, and a transformer-based classification model;
   aggregating, by the device, each probability value relating to each classification associated with each sentence provided by each of the multiple types of classification models;
   selecting, by the device based on the aggregating, a first classification for each sentence of the requirement text; and
   generating, by the device based on the selecting, the at least one of the test case or the test script.

2. The method of claim 1, wherein the error includes two or more of a typographical error, an incorrect labeling of one or more sentences of the requirement text, or an insufficient number of sentences.

3. The method of claim 1, wherein the aggregating comprises:
   averaging, by the device, each of the probability values associated with each classification associated with each sentence.

4. The method of claim 1, further comprising:
   comparing, by the device, an aggregated probability value to a threshold probability value; and
   determining, by the device, whether the aggregated probability value satisfies the threshold probability value.

5. The method of claim 1, further comprising:
   determining, by the device, that the requirement text includes an error; and
   invoking, by the device, a remedial procedure.

6. The method of claim 1, wherein the model profile further indicates a utility criteria.

7. The method of claim 1, further comprising:
   comparing, by the device, the model profile to a corresponding resource usage criteria of the multiple types of classification models.

8. The method of claim 1, further comprising:
   generating, by the device, a schedule to execute the at least one of the test case or the test script based on one or multiple criteria values generated by one or multiple predictive models.

9. A device comprising:
   a processor configured to:
      analyze a requirement text relating to at least one of a test case or a test script;
      select, based on the analysis and in response to determining that the requirement text does not include an error, a model profile, wherein the model profile indicates a resource usage criterion to satisfy by each classification model before permitted to classify each sentence of the requirement text;
      determine, a classification for each sentence of the requirement text based on classifying each sentence using multiple types of classification models that satisfied the model profile, wherein the multiple types of classification models include a tree-based classification model, a vector-based classification model, and a transformer-based classification model;
      aggregate each probability value relating to each classification associated with each sentence provided by each of the multiple types of classification models;
      select, based on the aggregation, a first classification for each sentence of the requirement text; and
      generate, based on the selection, the at least one of the test case or the test script.

10. The device of claim 9, wherein the error includes two or more of a typographical error, an incorrect labeling of one or more sentences of the requirement text, or an insufficient number of sentences.

11. The device of claim 9, wherein to aggregate, the processor is further configured to:
   average each of the probability values associated with each classification associated with each sentence.

12. The device of claim 9, wherein the processor is further configured to:
   compare an aggregated probability value to a threshold probability value; and
   determine whether the aggregated probability value satisfies the threshold probability value.

13. The device of claim 9, wherein the processor is further configured to:
   determine that the requirement text includes an error; and
   invoke a remedial procedure.

14. The device of claim 9, wherein the model profile further indicates a utility criteria.

15. The device of claim 9, wherein the processor is further configured to:
   compare the model profile to a corresponding resource usage criteria of the multiple types of classification models.

16. The device of claim 9, wherein the processor is further configured to:
   generate a schedule to execute the at least one of the test case or the test script based on one or multiple criteria values generated by one or multiple predictive models.

17. A non-transitory computer-readable storage medium storing instructions executable by a processor of a device, wherein the instructions are configured to:
   analyze a requirement text relating to at least one of a test case or a test script;
   select, based on the analysis and in response to determining that the requirement text does not include an error, a model profile, wherein the model profile indicates a resource usage criterion to satisfy by each classification model before permitted to classify each sentence of the requirement text;
   determine, a classification for each sentence of the requirement text based on classifying each sentence using multiple types of classification models that satisfied the model profile, wherein the multiple types of classification models include a tree-based classification model, a vector-based classification model, and a transformer-based classification model;
   aggregate each probability value relating to each classification associated with each sentence provided by each of the multiple types of classification models;
   select, based on the aggregation, a first classification for each sentence of the requirement text; and
   generate, based on the selection, the at least one of the test case or the test script.

18. The non-transitory computer-readable storage medium of claim 17, wherein the error includes two or more of a typographical error, an incorrect labeling of one or more sentences of the requirement text, or an insufficient number of sentences.

19. The non-transitory computer-readable storage medium of claim 17, wherein the model profile further indicates a utility criteria.

20. The non-transitory computer-readable storage medium of claim 17, wherein the instructions are further configured to:
   compare an aggregated probability value to a threshold probability value; and
   determine whether the aggregated probability value satisfies the threshold probability value.

* * * * *